United States Patent

Tatebayashi

Patent Number: 5,943,415
Date of Patent: Aug. 24, 1999

[54] AUTOMATIC CALL DISTRIBUTING QUEUING (ACDQ) CALL TRANSFER METHOD AND TELEPHONE SYSTEM HAVING ACDQ CALL TRANSFER FUNCTION

[75] Inventor: Hirokazu Tatebayashi, Tokyo, Japan

[73] Assignee: NEC Corporation, Tokyo, Japan

[21] Appl. No.: 08/844,841

[22] Filed: Apr. 22, 1997

[30] Foreign Application Priority Data

Apr. 26, 1996 [JP] Japan ................................. 8-130969

[51] Int. Cl.⁶ .............................. H04M 3/00; H04M 3/42
[52] U.S. Cl. ...................... 379/265; 379/266; 379/309; 379/212
[58] Field of Search ..................... 379/265, 266, 379/309, 210, 211, 212, 201, 269, 274; 370/270

[56] References Cited

U.S. PATENT DOCUMENTS

| | | | |
|---|---|---|---|
| 4,951,310 | 8/1990 | Honda et al. | 379/266 |
| 4,953,204 | 8/1990 | Cuschleg, Jr. et al. | 379/266 |
| 5,291,552 | 3/1994 | Kerrigan et al. | 379/266 |
| 5,299,259 | 3/1994 | Otto | 379/266 |
| 5,524,147 | 6/1996 | Bean | 379/266 |
| 5,592,542 | 1/1997 | Honda et al. | 379/266 |
| 5,633,924 | 5/1997 | Kaish et al. | 379/266 |
| 5,740,238 | 4/1998 | Flockhart et al. | 379/266 |
| 5,754,639 | 5/1998 | Flockhart et al. | 379/266 |

FOREIGN PATENT DOCUMENTS 5-284234  10/1993  Japan .

*Primary Examiner*—Harry S. Hong
*Assistant Examiner*—Benny Q. Tieu
*Attorney, Agent, or Firm*—Foley & Lardner

[57] ABSTRACT

In an ACDQ (Automatic Call Distribution Queuing) call transfer method, when an incoming ACDQ call takes place in a telephone set group for exclusively handling ACDQ calls in an ACDQ group which is set by a plurality of telephone sets connected to a plurality of switching centers, it is determined whether all the telephone sets belonging to the telephone set group are busy. The ACDQ call is transferred to the same telephone set group connected to a switching center of a transfer destination which forms the same ACDQ group when all the telephone sets belonging to the telephone set group are busy. Ghost calls as virtual call sounds are originated from the switching center of the transfer destination to at least idle telephone sets in the same telephone set group. The actual ACDQ call is transferred to a telephone set which responds to the originated ghost call first. The ghost calls to remaining telephone sets are released.

10 Claims, 3 Drawing Sheets

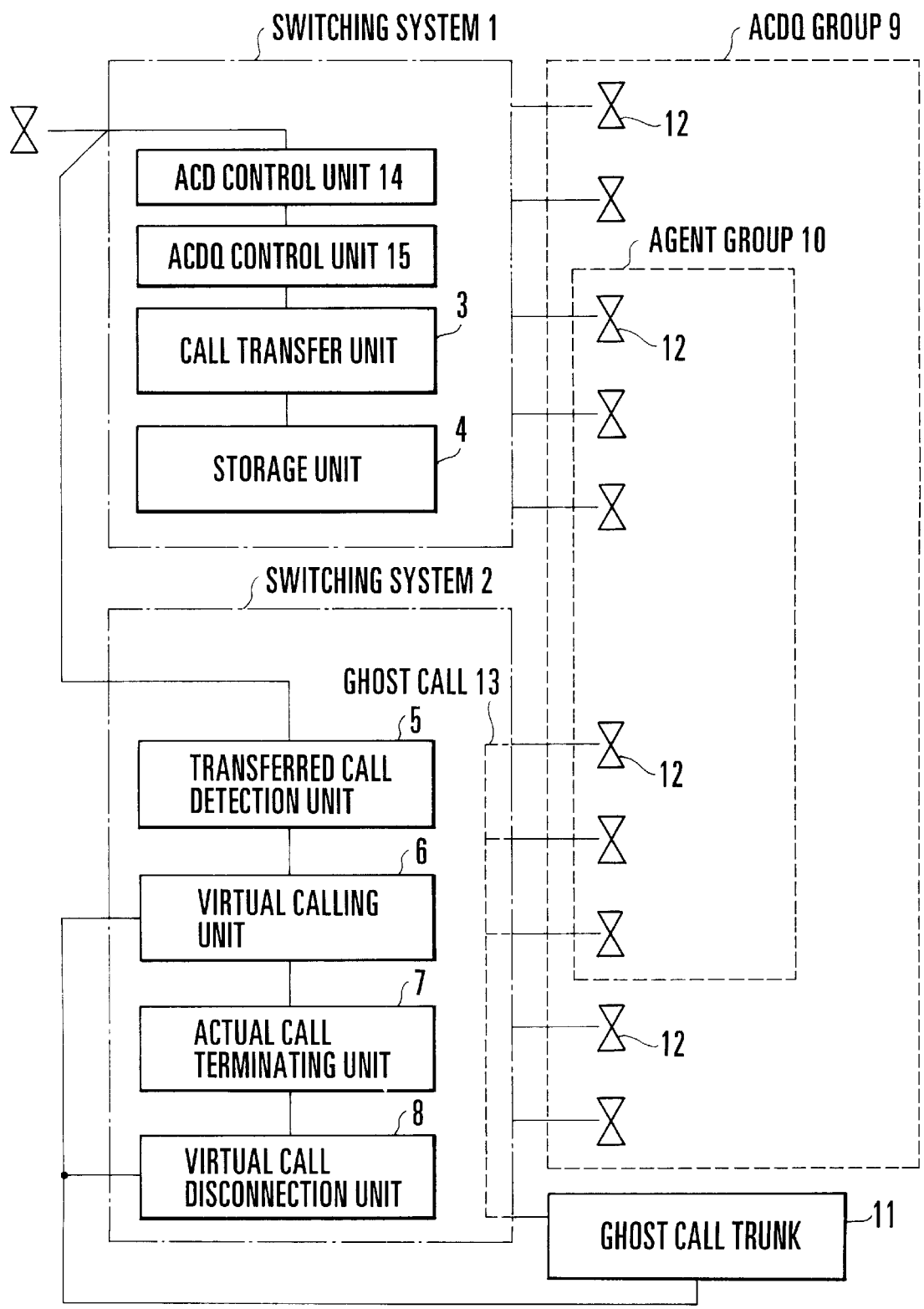
F I G. 1

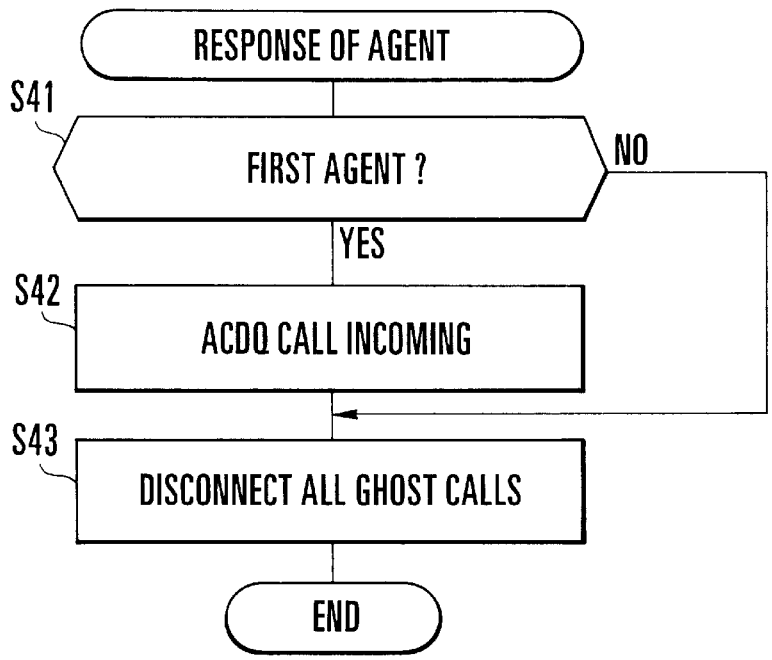
F I G. 4

AUTOMATIC CALL DISTRIBUTING QUEUING (ACDQ) CALL TRANSFER METHOD AND TELEPHONE SYSTEM HAVING ACDQ CALL TRANSFER FUNCTION

BACKGROUND OF THE INVENTION

The present invention relates to a telephone system having an ACD (Automatic Call Distribution) function of automatically and uniformly distributing an incoming call to a predetermined telephone set group and, more particularly, to a telephone system which transfers an ACDQ (ACD Queuing) call when an ACD telephone set group has no telephone sets capable of responding to an incoming call, and an ACDQ call transfer method.

Japanese Patent Laid-Open No. 5-284284 proposes, as a conventional telephone system having an ACD function, a telephone system which responds to an incoming call as required even when an ACD telephone set group is in an incoming call rejecting state, thereby improving the service to callers.

For a conventional ACDQ function, a plurality of telephone sets (to be referred to as agents hereinafter) which are connected to a plurality of stations and exclusively handle ACDQ incoming calls are divided into several groups (to be referred to as agent groups hereinafter).

As shown in FIG. 5, when an incoming call takes place in the ACDQ group, the CPU (Central Processing Unit) of a switching center determines whether the incoming call is an ACDQ call (step S51). If NO in step S51, the CPU performs normal call termination processing (step S52).

If YES in step S51, an agent group for receiving the ACDQ call is determined (step S53). It is determined whether an idle agent is present in the determined agent group (step S54). If YES in step S54, ACDQ call termination processing for the agent is performed (step S56).

If NO in step S54, queuing processing is performed (step S55) until an agent becomes idle.

However, the conventional telephone system having the ACDQ function has a problem that, when there are no idle agents, the ACDQ call is queued to make the caller wait for a response. Even when an agent belonging to the same agent group and connected to another station is idle, the ACDQ call is queued as long as all the agents belonging to the same agent group and connected to the station in which the call is incoming first are busy.

SUMMARY OF THE INVENTION

It is an object of the present invention to provide an ACDQ call transfer system which reduces the number of calls subjected to queuing to improve an ACDQ function, and a telephone system having an ACDQ call transfer function.

In order to achieve the above object, according to the present invention, there is provided an ACDQ call transfer method comprising the steps of determining, when an incoming ACDQ (Automatic Call Distribution Queuing) call takes place in a telephone set group for exclusively handling ACDQ calls in an ACDQ group which is set by a plurality of telephone sets connected to a plurality of switching centers, whether all the telephone sets belonging to the telephone set group are busy, transferring the ACDQ call to the same telephone set group connected to a switching center of a transfer destination which forms the same ACDQ group when all the telephone sets belonging to the telephone set group are busy, originating ghost calls as virtual call sounds from the switching center of the transfer destination to at least idle telephone sets in the same telephone set group, transferring the actual ACDQ call to a telephone set which responds to the originated ghost call first, and releasing the ghost calls to remaining telephone sets.

BRIEF DESCRIPTION OF THE DRAWINGS

FIG. 1 is a block diagram showing the schematic arrangement of a telephone system having an ACDQ call transfer function according to an embodiment of the present invention;

FIG. 4 is a flow chart showing processing of an actual call termination unit and a virtual call disconnection unit shown in FIG. 1.

DESCRIPTION OF THE PREFERRED EMBODIMENT

Figure 2:
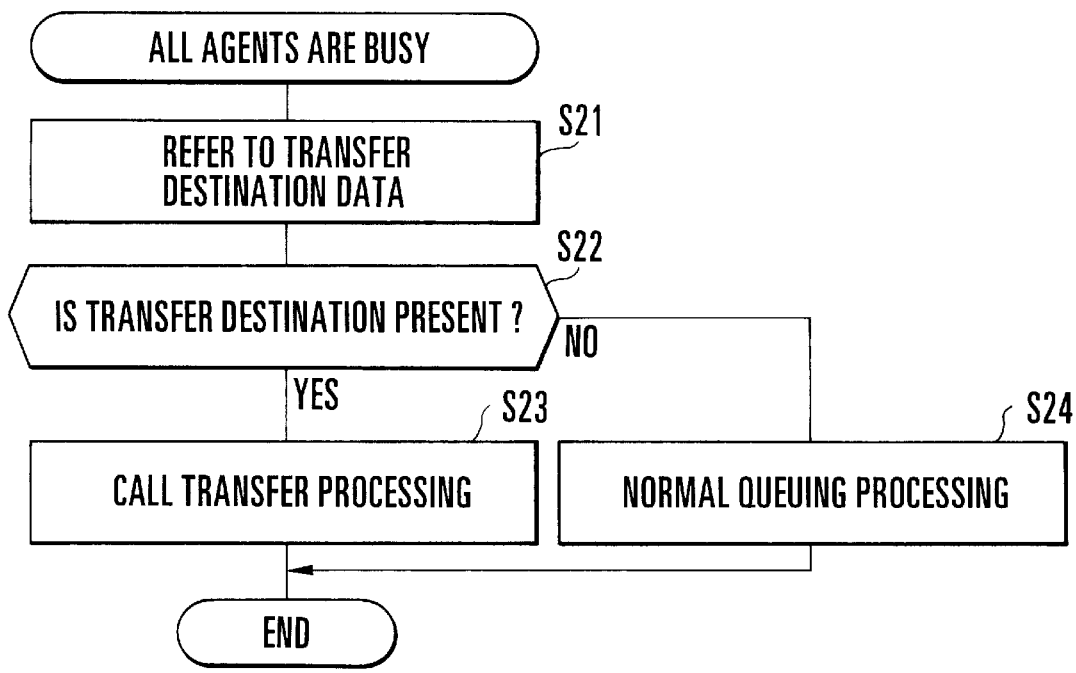
FIG. 2 is a flow chart showing processing of a call transfer unit shown in FIG. 1.

The present invention will be described below in detail with reference to the accompanying drawings.

FIG. 1 shows the schematic arrangement of a telephone system according to the embodiment of the present invention. Referring to FIG. 1, reference numeral 1 denotes a switching system of a transfer source; and 2, a switching system of a transfer destination. The switching system 1 comprises an ACD control unit 14 for performing ACD control for an ACD call, an ACDQ control unit 15 which performs ACDQ control when all agents for handling ACD calls are busy, a call transfer unit 3 for performing ACDQ call transfer processing, and a storage unit 4 in which transfer destination data is set. The switching system 2 comprises a transferred call detection unit 5 for detecting an ACDQ call transferred from the switching system 1, a virtual calling unit 6 for originating a virtual call upon detecting the transferred ACDQ call, an actual call terminating unit 7 for originating an actual call in accordance with a response to the virtual call, and a virtual call disconnection unit 8 for stopping the virtual call in accordance with the response to the virtual call.

A plurality of agents 12 are connected to the switching systems 1 and 2. An ACDQ group 9 is set by the agents 12 connected to the switching system 1 and the agents 12 connected to the switching system 2. In the ACDQ group 9, an agent group 10 is set by grouping the agents 12 connected to the switching system 1 and the agents 12 connected to the switching system 2. A ghost call trunk 11 originates a ghost call 13.

In the above-described telephone system, when an ACDQ call is incoming in the switching system 1, and all the agents 12 belonging to the agent group 10 and connected to the switching system 1 are busy, the ACDQ call is transferred to the agent group 10 connected to the switching system 2 which constitutes the same ACDQ group 9. The switching system 2 to which the ACDQ call is transferred originates ghost calls (dummy calls) 13 as virtual call sounds to all the idle agents 12 in the agent group 10. The actual ACDQ call is incoming in the agent 12 which has responded to the ghost call 13 first while the remaining ghost calls 13 are released. On the other hand, when all the agents belonging to the agent group 10 and connected to the switching system 2 are busy, the ACDQ call is queued in the switching system 1.

When the switching system 1 detects the incoming ACDQ call, ACD control is performed in the switching system 1. The ACDQ control unit 15 determines whether all the agents 12 in the agent group 10 in which the ACDQ call is incoming are busy. Upon detecting that all the agents 12 are busy, the call transfer unit 3 retrieves data from the storage unit 4. The storage unit 4 stores the agent group 10 of another station (switching system 2) in the same ACDQ group 9 in advance as transfer destination data.

The call transfer unit 3 reads out the transfer destination data from the storage unit 4 and transfers the call. In the station (switching system 2) to which the call is transferred, the transferred call detection unit 5 determines whether the incoming call is an ACDQ call transferred because all the agents 12 are busy. When the incoming call is an ACDQ call transferred because all the agents 12 are busy, the transferred call detection unit 5 transfers call control to the virtual calling unit 6 to hunt the ghost call trunk 11 and originate the ghost calls 13 to all the agents 12 belonging to the agent group 10 and connected to the switching system 2.

Upon detecting the agent which has responded to the ghost call 13 first, the virtual calling unit 6 transfers call control to the actual call terminating unit 7 to connect the actual call, i.e., the transferred call to the agent 12 which has responded to the call first. Thereafter, the actual call terminating unit 7 transfers call control to the virtual call disconnection unit 8 to disconnect the ghost calls 13 to the agents 12 other than the agent which has responded to the call. When all the agents 12 belonging to the agent group 10 and connected to the switching system 2 are busy, the ACDQ control unit 15 in the switching system 1 queues the ACDQ call.

An operation of the main part of the telephone system having the above arrangement will be described below in detail with reference to flow charts shown in FIGS. 2 to 4.

Referring to FIG. 2, if the ACDQ control unit 15 determines that all the agents 12 in the agent group 10 in which the ACDQ call is incoming are busy, call transfer processing is performed by the call transfer unit 3. More specifically, by referring to transfer destination data in the storage unit 4 (step S21), it is determined whether a transfer destination is present (step S22). If YES in step S22, the call is transferred in accordance with the transfer destination data read out from the storage unit 4 (step S23). If NO in step S22, normal queuing processing is performed (step S24).

Figure 3:
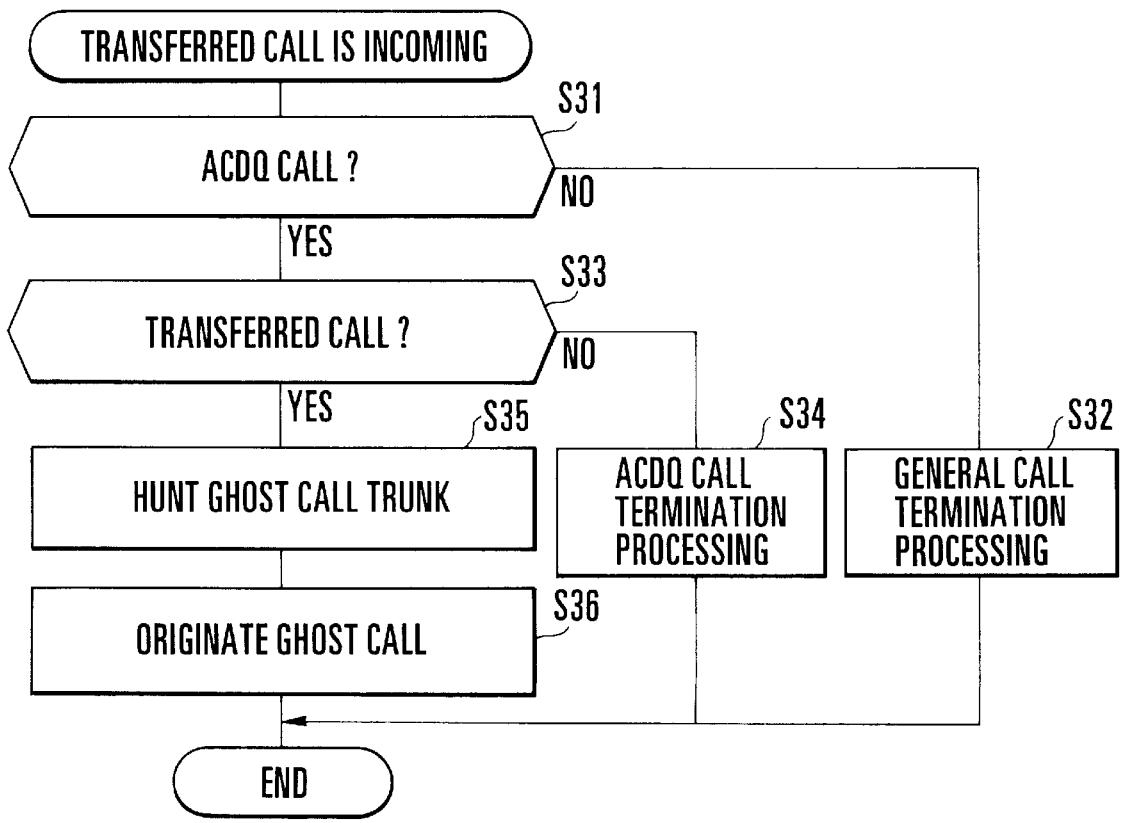
FIG. 3 is a flow chart showing processing of a transfer call detection unit shown in FIG. 1.
Figure 5:
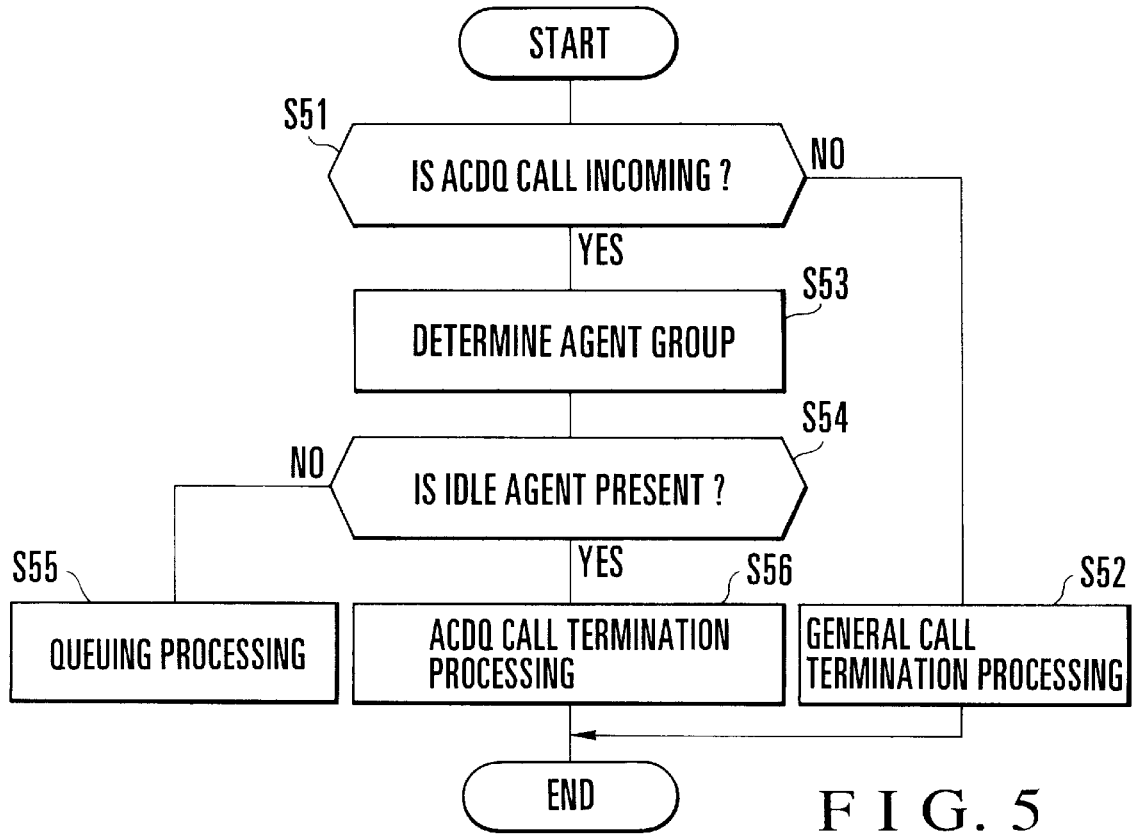
FIG. 5 is a flow chart showing an operation of a switching system in a conventional telephone system.

As shown in FIG. 3, the station to which the call is transferred determines, upon receiving the call, whether the call is an incoming ACDQ call (step S31). If NO in step S31, normal general call termination processing is performed (step S32). If YES in step S31, it is determined whether the ACDQ call is transferred from another station because all the agents 12 are busy (step S33). If NO in step S33, normal ACDQ call termination processing is performed (step S34).

If YES in step S33, the ghost call trunk 11 is hunted (step S35) to originate the ghost calls 13 to the target agents 12 in the agent group 10 (step S36). When the agent 12 responds to the ghost call 13, it is determined whether the agent responds to the call first, as shown in FIG. 4 (step S41). If YES in step S41, the actual ACDQ call is connected to the agent which has responded to the ghost call (step S42), and sending of all the ghost calls 13 is stopped (step S43). If NO in step S41, origination of all the ghost calls 13 is immediately stopped in step S43.

For the descriptive convenience, the above embodiment assumes that the switching system 1 of the transfer source has the ACD control unit 14, the ACDQ control unit 15, the call transfer unit 3, and the storage unit 4, and the switching system 2 of the transfer destination has the transferred call detection unit 5, the virtual calling unit 6, the actual call terminating unit 7, and the virtual call disconnection unit 8. However, since the relationship between the transfer source and destination may be reversed, each of the switching systems 1 and 2 has all the elements of the transfer source and destination.

As has been described above, according to the present invention, an incoming ACDQ call for which conventional system performs queuing processing is transferred to the same agent group connected to the plurality of stations. With this arrangement, the number of calls subjected to queuing can be reduced.

What is claimed is:

1. An ACDQ call transfer method comprising the steps of:
receiving an incoming ACDQ (Automatic Call Distribution Queuing) call at a first switching center that is connected to first through nth telephone sets that comprise a first subset of a first telephone set group for exclusively handling ACDQ calls, wherein at least an n+1st and an n+2nd telephone set that comprises a second subset of said first telephone set group is connected to a second switching center and is not connected to said first switching center, wherein n is an integer greater than one;
determining whether all of said first through nth telephone sets belonging to said first subset of said first telephone set group are busy;
transferring the ACDQ call to the second switching center which corresponds to a transfer destination when all said first through nth telephone sets belonging to said first subset of said first telephone set group are busy;
originating ghost calls as a ringing signal from said second switching center of the transfer destination to at least idle telephone sets, if any, in the second subset of said first telephone set group;
transferring the ACDQ call to a telephone set which responds to the originated ghost call first; and
releasing the ghost calls to remaining telephone sets of said second subset of said first telephone set group.

2. A method according to claim 1, further comprising the step of performing ACDQ (ACD queuing) control for queuing the incoming ACDQ call only in the first switching center when all said telephone sets belonging to the second subset of said first telephone set group connected to said second switching center of the transfer destination are busy.

3. A method according to claim 1, wherein the step of transferring the ACDQ call comprises the steps of retrieving transfer destination data from a memory located at the first switching center and transferring the ACDQ call to the second switching center on the basis of the retrieved transfer destination data.

4. A method according to claim 1, further comprising the step of detecting, in said second switching center of the transfer destination, a call transferred from said first switching center of a transfer source.

5. A method according to claim 1, wherein the releasing step releases the ghost calls to the remaining telephone sets of said second subset of said first telephone set group as soon as one telephone set of said second subset of said first telephone set group responds to the originated ghost call first.

6. A method according to claim 1, wherein, when more than one telephone set in said second subset is idle, each of said more than one telephone set receives the ghost call, wherein a first one of the more than one telephone set that answers the ghost call is connected to the incoming call, and wherein all others of the more than one telephone set stop receiving the ghost call and are not connected to the incoming call.

7. A telephone system having an ACDQ (Automatic Call Distribution Queuing) call transfer function, the telephone system including at least a first switching center and a second switching center, said first switching center comprising:

an ACD (Automatic Call Distribution) control unit for performing ACD control for automatically and substantially uniformly distributing an incoming call received by said first switching center to a telephone set group set by at least a first plurality of telephone sets connected to said first switching center and a second plurality of telephone sets connected to said second switching center, all telephone sets in said first plurality being different from all telephone sets in said second plurality;

a storage unit for storing incoming call transfer destination data;

a call transfer unit for transferring the incoming call to said second switching center on the basis of the transfer destination data stored in said storage unit when all said first plurality of telephone sets in said telephone set group that are connected to said first switching center are busy;

said second switching center comprising:

a transferred call detection unit for detecting a call transferred from said first switching center of a transfer source;

a virtual calling unit for originating ghost calls as a ringing signal to said telephone sets in said second plurality belonging to the telephone set group that are connected to said second switching center of a transfer destination upon detecting the transferred call;

a transferred call termination unit for terminating the transferred call to a telephone set in said second plurality which responds to the ghost call first;

a virtual call disconnection unit for disconnecting the ghost calls to remaining telephone sets in said second plurality belonging to the telephone set group connected to said second switching center of the transfer destination; and wherein said first switching center further comprises:

an ACDQ (ACD Queuing) control unit for performing ACDQ control for queuing the incoming call in said first switching center when said second switching center notifies said first switching center that all said second plurality of telephone sets belonging to the first telephone set group connected to said second switching center of the transfer destination are busy.

8. A system according to claim 7, further comprising a ghost call trunk for sending the ghost calls to idle telephone sets belonging to said second plurality of the first telephone set group connected to said second switching center of the transfer destination under control of said virtual calling unit.

9. A system according to claim 8, wherein said virtual call disconnection unit disconnects the ghost calls to the remaining telephone sets as soon as the incoming call has been terminated by said transferred call termination to one telephone set of said second subset of said first telephone set group which responds to the ghost call first.

10. A system according to claim 8, wherein, when more than one telephone set in said second subset is idle, each of said more than one telephone set receives the ghost calls, wherein a first one of the more than one telephone set that answers the ghost call is connected to the incoming call, and wherein all others of the more than one telephone set stop receiving the ghost call and are not connected to the incoming call.

\* \* \* \* \*